(12) United States Patent
Li et al.

(10) Patent No.: US 11,012,884 B2
(45) Date of Patent: *May 18, 2021

(54) ACCESS METHOD AND SYSTEM, USER EQUIPMENT, AND NETWORK SIDE DEVICE

(71) Applicant: Huawei Technologies Co., Ltd., Shenzhen (CN)

(72) Inventors: Hantao Li, Beijing (CN); Min Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,236

(22) Filed: Jun. 11, 2018

(65) Prior Publication Data

US 2018/0295536 A1 Oct. 11, 2018

Related U.S. Application Data

(63) Continuation of application No. 15/360,772, filed on Nov. 23, 2016, now Pat. No. 10,009,787, which is a (Continued)

(30) Foreign Application Priority Data

Dec. 8, 2011 (CN) .......................... 201110406270.9

(51) Int. Cl.
*H04W 28/02* (2009.01)
*H04W 48/20* (2009.01)
(Continued)

(52) U.S. Cl.
CPC ... *H04W 28/0205* (2013.01); *H04W 28/0226* (2013.01); *H04W 28/0231* (2013.01);
(Continued)

(58) Field of Classification Search
CPC . H04W 48/20; H04W 48/08; H04W 48/0205; H04W 36/0061; H04W 36/22;
(Continued)

(56) References Cited

U.S. PATENT DOCUMENTS 9,526,055 B2 * 12/2016 Li .................... H04W 48/20
2002/0085516 A1 7/2002 Bridgelall
(Continued)

FOREIGN PATENT DOCUMENTS

| CN | 1479514 A | 3/2004 |
| CN | 1505339 A | 6/2004 |

(Continued)

OTHER PUBLICATIONS

"3rd Generation Partnership Project; Technical Specification Group Services and System Aspects; IP flow mobility and seamless Wireless Local Area Network (WLAN) offload;Stage 2(Release 10)" 3GPP TS 23.261 V10.1.0, pp. 1-22, 3rd Generation Partnership Project, Valbonne, France (Sep. 2010).
(Continued)

*Primary Examiner* — Jianye Wu
(74) *Attorney, Agent, or Firm* — Leydig, Voit & Mayer, Ltd.

(57) ABSTRACT

An access method and system, a user equipment, and a network side device are provided. The method includes: receiving, by a user equipment, a first message that carries an identifier of a second network access point, where the second network access point can perform air interface offloading on a first network in which a user equipment is currently located; and when the first message carries identifiers of a plurality of second network access points, selecting, by the user equipment, one second network access point from the plurality of second network access points according to first auxiliary information, and accessing the selected
(Continued)

second network access point. By adopting the technical solutions in the embodiments of the present invention, an access delay can be effectively shortened, and access efficiency can improved, thereby effectively implementing offloading.

19 Claims, 6 Drawing Sheets

Related U.S. Application Data continuation of application No. 14/299,654, filed on Jun. 9, 2014, now Pat. No. 9,526,055, which is a continuation of application No. PCT/CN2012/086059, filed on Dec. 6, 2012.

(51) Int. Cl.
*H04W 36/22* (2009.01)
*H04W 48/08* (2009.01)
*H04W 36/00* (2009.01)
*H04W 84/12* (2009.01)

(52) U.S. Cl.
CPC ....... *H04W 28/0236* (2013.01); *H04W 36/22* (2013.01); *H04W 48/08* (2013.01); *H04W 48/20* (2013.01); *H04W 36/0061* (2013.01); *H04W 84/12* (2013.01)

(58) Field of Classification Search
CPC ......... H04W 28/0231; H04W 28/0226; H04W 28/0236; H04W 84/12
See application file for complete search history.

(56) References Cited

U.S. PATENT DOCUMENTS

| | | | |
|---|---|---|---|
| 2004/0047323 A1 | 3/2004 | Park et al. | |
| 2004/0105416 A1 | 6/2004 | Rue | |
| 2004/0165563 A1 | 8/2004 | Hsu et al. | |
| 2004/0185845 A1* | 9/2004 | Abhishek | H04W 48/16 455/422.1 |
| 2006/0217147 A1* | 9/2006 | Olvera-Hernandez | H04W 36/005 455/552.1 |
| 2006/0274743 A1 | 12/2006 | Yegin et al. | |
| 2007/0060105 A1 | 3/2007 | Batta | |
| 2007/0140163 A1 | 6/2007 | Meier et al. | |
| 2007/0224988 A1 | 9/2007 | Shaheen | |
| 2008/0031212 A1 | 2/2008 | Ogura | |
| 2008/0102852 A1 | 5/2008 | Du et al. | |
| 2009/0245133 A1 | 10/2009 | Gupta et al. | |
| 2009/0278705 A1 | 11/2009 | Chhabra et al. | |
| 2010/0195632 A1 | 8/2010 | Prabhu | |
| 2010/0323698 A1 | 12/2010 | Rune et al. | |
| 2011/0051826 A1* | 3/2011 | Jung | H04W 72/042 375/260 |
| 2011/0222523 A1* | 9/2011 | Fu | H04W 12/06 370/338 |
| 2011/0235546 A1 | 9/2011 | Horn et al. | |
| 2011/0267977 A1 | 11/2011 | Doppler et al. | |
| 2011/0286437 A1 | 11/2011 | Austin et al. | |
| 2012/0082090 A1 | 4/2012 | Horn et al. | |
| 2012/0089361 A1 | 4/2012 | Douglas et al. | |
| 2012/0170548 A1 | 7/2012 | Rajagopalan et al. | |
| 2013/0070641 A1 | 3/2013 | Meier et al. | |
| 2013/0084835 A1* | 4/2013 | Scherzer | H04W 28/08 455/414.1 |
| 2013/0201842 A1 | 8/2013 | Chou et al. | |
| 2014/0092889 A1 | 4/2014 | Chhabra et al. | |

FOREIGN PATENT DOCUMENTS

| | | |
|---|---|---|
| CN | 1614926 A | 5/2005 |
| CN | 1617603 A | 5/2005 |
| CN | 1823497 A | 8/2006 |
| CN | 101119263 A | 2/2008 |
| CN | 101347005 A | 1/2009 |
| CN | 101406090 A | 4/2009 |
| CN | 101449617 A | 6/2009 |
| CN | 101472325 A | 7/2009 |
| CN | 101500297 A | 8/2009 |
| CN | 101505524 A | 8/2009 |
| CN | 101512520 A | 8/2009 |
| CN | 101730172 A | 6/2010 |
| CN | 101801051 A | 8/2010 |
| CN | 101820628 A | 9/2010 |
| CN | 101867979 A | 10/2010 |
| CN | 101986746 A | 3/2011 |
| CN | 101990247 A | 3/2011 |
| CN | 102017781 A | 4/2011 |
| CN | 102647771 A | 8/2012 |
| EP | 1597868 A2 | 11/2005 |
| EP | 2237610 A1 | 10/2010 |
| JP | 2011521549 A | 7/2011 |
| WO | 2004077751 A2 | 9/2004 |
| WO | 2009137718 A1 | 11/2009 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" 3GPP TS 36.300 V10.5.0, pp. 1-194, 3rd Generation Partnership Project, Valbonne, France (Sep. 2011).

"3rd Generation Partnership Project; Technical Specification Group Radio Access Network; Evolved Universal Terrestrial Radio Access (E-UTRA); Radio Resource Control (RRC);Protocol specification(Release 10)" 3GPP TS 36.331 V10.3.0, pp. 1-296, 3rd Generation Partnership Project, Valbonne, France (Sep. 2011).

* cited by examiner

ACCESS METHOD AND SYSTEM, USER EQUIPMENT, AND NETWORK SIDE DEVICE

CROSS-REFERENCE TO RELATED APPLICATIONS

This application is a continuation of U.S. patent application Ser. No. 15/360,772, filed on Nov. 23, 2016, which is a continuation of U.S. patent application Ser. No. 14/299,654, filed on Jun. 9, 2014, now U.S. Pat. No. 9,526,055, which is a continuation of International Patent Application No. PCT/CN2012/086059, filed on Dec. 6, 2012, which claims priority to Chinese Patent Application No. 201110406270.9, filed on Dec. 8, 2011. All of the afore-mentioned patent applications are hereby incorporated by reference in their entireties.

TECHNICAL FIELD

Embodiments of the present invention relate to the field of communications technologies, and in particular, to an access method and system, a user equipment, and a network side device.

BACKGROUND

As a communication market develops, the number of users increases, and data services rise, an air interface resource increasingly becomes a bottleneck to the development of a communication service. If a network in one mode can be used to perform air interface offloading on a network in another mode, not only a throughput rate of an air interface is greatly elevated, but also a construction cost of a network can be reduced, and meanwhile, user experience can be effectively improved.

For example, in the prior art, a technology in which a wireless local area network (WLAN) is adopted to perform offloading on a third generation partnership project (3GPP) communication system exists, and is used to implement that when the same physical area is covered by both the 3GPP and the WLAN, a part of data streams are transmitted in the 3GPP communication system, and another part of data streams are transmitted in the WLAN, thereby implementing offloading performed by the WLAN on data streams in a 3GPP mobile communication network. In the technology, an offload control server is disposed, and after a user equipment (UE) establishes a radio resource control (RRC) connection in a radio access network (RAN), the offload control server instructs the UE to perform WLAN offloading, where this instruction carries an extended service set identifier (ESSID) that corresponds to an access point (AP) used in a WLAN. The UE searches a cell in the WLAN according to an ESSID in a received WLAN offloading instruction, so as to obtain a corresponding AP. However, an ESSID in a WLAN AP cannot uniquely identify a cell because a plurality of cells may adopt one ESSID, and different cells may be named with the same one ESSID. Therefore, the UE may access a wrong WLAN AP according to an ESSID, so that the UE needs to perform access again until the UE accesses a correct WLAN AP.

In a process of implementing the present invention, the inventor finds that the conventional art has at least the following defects: When the foregoing existing WLAN offload technology is adopted, in a process that a UE accesses a correct WLAN AP, an access delay is too long, and access efficiency is relatively low.

SUMMARY

Embodiments of the present invention provide an access method and system, a user equipment, and a network side device, so as to solve defects in the conventional art that an access delay is too long and access efficiency is relatively low in a process that a UE accesses a correct WLAN AP in an existing WLAN offload technology, thereby providing effective access.

An embodiment of the present invention provides an access method, which includes:

receiving, by a user equipment, a first message that carries an identifier of a second network access point, where the second network access point can perform air interface offloading with a first network in which the user equipment is currently located; and when the first message carries identifiers of a plurality of second network access points, selecting, by the user equipment, one second network access point from the plurality of second network access points according to first auxiliary information, and accessing the selected second network access point.

An embodiment of the present invention further provides an access method, which includes:

obtaining, by a network side device, an identifier of a second network access point, where a second network access point corresponding to the identifier of the second network access point can perform air interface offloading on a first network in which a user equipment is currently located;

generating, by the network side device and according to the obtained identifier of the second network access point, a first message that carries the identifier of the second network access point; and when the first message carries identifiers of a plurality of second network access points, sending, by the network side device, the first message to the user equipment, so that the user equipment selects an identifier of one second network access point from the identifiers of the plurality of second network access points according to first auxiliary information and accesses the selected second network access point.

An embodiment of the present invention provides a user equipment, which includes:

a receiving module, configured to receive a first message that carries an identifier of a second network access point, where the second network access point can perform air interface offloading on a first network in which the user equipment is currently located; and an accessing module, configured to, when the first message carries identifiers of a plurality of second network access points, select one second network access point from the plurality of second network access points according to first auxiliary information, and access the selected second network access point.

An embodiment of the present invention further provides a network side device, which includes:

an obtaining module, configured to obtain an identifier of the second network access point, where a second network access point corresponding to the identifier of the second network access point can perform air interface offloading on a first network in which a user equipment is currently located;

a generating module, configured to generate, according to the obtained identifier of the second network access point, a first message that carries the identifier of the second network access point; and a sending module, configured to, when the first message carries identifiers of a plurality of second network access points, send the first message to the user equipment, so that the user equipment selects an identifier of one second network access point from the identifiers of the plurality of second network access points according to first auxiliary information and accesses the selected second network access point.

An embodiment of the present invention further provides an access system, which includes the user equipment as described in the foregoing and the network side device as described in the foregoing.

With the access method and system, the user equipment, and the network side device according to the embodiments of the present invention, an optimal second network access point is selected through auxiliary information for a user equipment to access. Therefore, an access delay can be effectively shortened, and access efficiency can be improved, thereby effectively implementing offloading.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
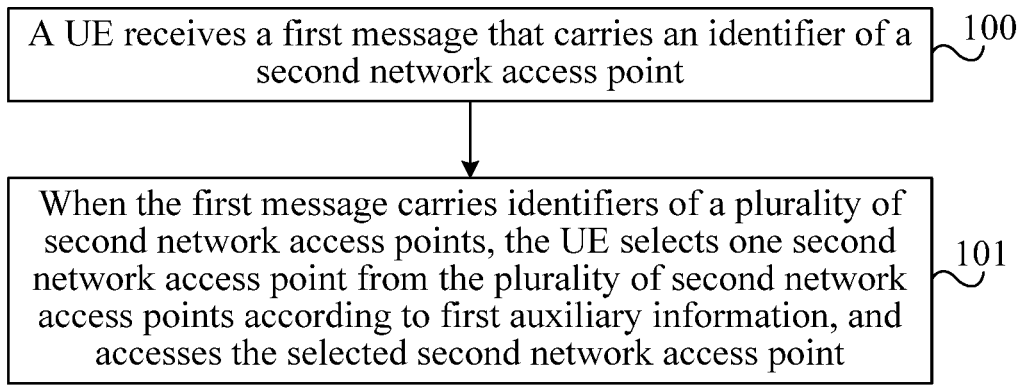
FIG. 1 is a flow chart of an access method provided in an embodiment of the present invention.

FIG. 1 is a flow chart of an access method provided in an embodiment of the present invention. As shown in FIG. 1, the access method provided in this embodiment may specifically include the following steps.

100: A UE receives a first message that carries an identifier of a second network access point.

In this embodiment, a second network access point of the identifier of the second network access point can perform air interface offloading on a first network in which the UE is currently located. It may be understood that a second network and the first network are communication networks of different standards, and the second network may perform air interface offloading on the first network. Furthermore, in a situation where various second networks have common coverage, the second networks may be a plurality of networks of different standards. Optionally, the identifier of the second network access point in this embodiment can uniquely identify the second network access point.

101: When the first message carries identifiers of a plurality of second network access points, the UE selects one second network access point from the plurality of second network access points according to first auxiliary information, and accesses the selected second network access point.

With the access method according to this embodiment, a UE receives a first message that carries an identifier of a second network access point, and when the first message carries identifiers of a plurality of second network access points, the UE selects one second network access point from the plurality of second network access points according to first auxiliary information, and accesses the corresponding second network access point.

Optionally, according to step 101 "when the first message carries identifiers of a plurality of second network access points" in this embodiment, it can be known that the first message received in step 100 may carry an identifier of one second network access point, and may also carry identifiers of a plurality of second network access points. When the first message carries identifiers of a plurality of second network access points, step 100 "A UE receives a first message that carries an identifier of a second network access point" may be understood as that: a UE receives a first message that carries identifiers of a plurality of second network access points.

By adopting the technical solution in this embodiment, one second network access point is selected from a plurality of second network access points according to first auxiliary information, and a UE does not need to attempt to access second network access points one by one, so that an access delay can be effectively shortened, and access efficiency can be improved, thereby effectively implementing offloading.

Optionally, step 100 "A UE receives a first message that carries an identifier of a second network access point" in the foregoing embodiment may specifically be that: a UE receives a first message that is sent by a network side device and carries an identifier of a second network access point.

Optionally, based on the technical solution in the foregoing embodiment, in a situation where the first network in which the UE is currently located simultaneously covers a plurality of second networks, for example, in a scenario of a macro site of the first network, the identifiers of the plurality of second network access points carried in the first message that is received by the UE in step 100 in the foregoing embodiment may be obtained through screening performed by the network side device according to second auxiliary information of each second network access point, where the second auxiliary information includes position information of each second network access point and/or load information of each second network access point. At this time, correspondingly, step 101 "the UE selects one second network access point from the plurality of second network access points according to first auxiliary information and accesses the selected second network access point" may specifically include that: the UE selects one second network access point front the plurality of second network access points according to position information of the UE and/or signal quality information of each second network access point, and accesses the selected second network access point. In this solution, the UE and a network side together select and determine an identifier of a second network access point, where the identifier of the second network access point corresponds to a second network access point to be accessed by the UE. For example, the network side screens the plurality of second network access points according to the position information of each second network access point and/or the load information of each second network access point, and obtains identifiers of the plurality of second network access points, and then the UE further selects one second network access point from the plurality of second network access points according to the position information of the UE and/or the signal quality information of each second network access point, and accesses the corresponding second network access point.

Optionally, based on the technical solution in the embodiment corresponding to FIG. 1, in a situation where the first network in which the UE is currently located simultaneously covers a plurality of second networks, for example, in a scenario of a macro site of the first network, the network side may not participate in selection and only the UE performs the selection. At this time, correspondingly, when the first message received in step 100 in the foregoing embodiment further carries position information of each second network access point and/or load information of each second network access point, the UE selects one second network access point from the plurality of second network access points according to the position information of each second network access point and/or the load information of each second network access point and position information of the UE and/or signal quality information of each second network access point, and accesses the corresponding second network access point. In this optional solution, the network side device sends the position information of each second network access point and/or the load information of each second network access point to the UE, and the UE selects and accesses one of the plurality of second network access points with reference to the position information of the UE itself and/or the signal quality information of each second network access point.

In addition, based on the technical solution in the embodiment corresponding to FIG. 1, when the first message includes only an identifier of one second network access point, the UE directly accesses a second network access point corresponding to the identifier of the one second network access point. A typical application scenario of the solution is that coverage of the first network is the same as or is approximate to that of the second network. For example, in a scenario of a micro site, at this time, in the network side device, one first network corresponds to only an identifier of one second network access point, and correspondingly, the network side device can obtain only an identifier of one second network access point, and send a first message to the UE, where the first message carries the identifier of the one second network node.

Or, optionally, when the first message received by the UE in step 100 includes only an identifier of one second network access point, at this time, correspondingly, the network side device selects one second network access point from a plurality of second network access points. For example, when the identifier of the one second network access point is obtained through screening performed by the network side device on the plurality of second network access points, the access method in the foregoing embodiment may further include:

sending, by the UE, position information of the UE and/or signal quality information of each second network access point to the network side device, so that the network side device selects one second network access point from the plurality of second network access points according to the position information of the UE and/or the signal quality information of each second network access point; and then sending, by the network side device, to the UE a first message that carries the identifier of the one second network access point.

As described in the foregoing, when the first message includes only the identifier of the one second network access point, at this time, step 100 "A UE receives a first message that carries an identifier of a second network access point" may be understood as that: "a UE receives a first message that carries an identifier of one second network access point". Optionally, in the foregoing embodiment, a situation where the network side device actively initiates the first message is described. In actual application, the UE may also initiate a trigger to the network side device, and then the network side device sends the first message. For example, before step 100 in the foregoing embodiment, the method may further include: sending, by the UE, an air interface offloading request message of a network access point to the network side device through the first network.

Optionally, the first message is a message after the air interface offloading request message and before the UE accesses the second network access point.

The first network in the foregoing embodiment may be a 3GPP mobile communication network, and the second network is a non-3GPP mobile communication network; or
  the first network is a non-3GPP mobile communication network, and the second network is a short distance wireless communication network; or
  the first network is a 3GPP mobile communication network, and the second network is a short distance wireless communication network.

The 3GPP mobile communication network includes a global mobile communication (GSM), wideband code division multiple access (WCDMA), time division-synchronous code division multiple access (TD-SCDMA), or long term evolution (LTE) network. The non-3GPP mobile communication network includes worldwide interoperability for microwave access (WiMAX) or code division multiple access (CDMA) 2000. The short distance wireless communication network includes a WLAN, infrared, Bluetooth, or Zigbee. In the embodiment of the present invention, it is preferred that the second network is a short distance wireless communication network.

Optionally, in the foregoing embodiment, when the second network is a WLAN, the identifier of the second network access point includes a basic service set identifier (BSSID) of the second network access point or a media access control (Medium/Media Access Control, hereinafter referred to as MAC) layer address of the second network access point, or a combination of the two. Definitely, based on the foregoing combination, an ESSID may further be included. For example, the identifier of the second network access point may be the BSSID of the second network access point+an ESSID of the second network access point.

By adopting the technical solution in the foregoing embodiment, an optimal second network access point can be selected through auxiliary information for a UE to access, and the UE does not need to attempt to access second network access points one by one. Therefore, an access delay can be effectively shortened, and access efficiency can be improved, thereby effectively implementing offloading.

Figure 2:
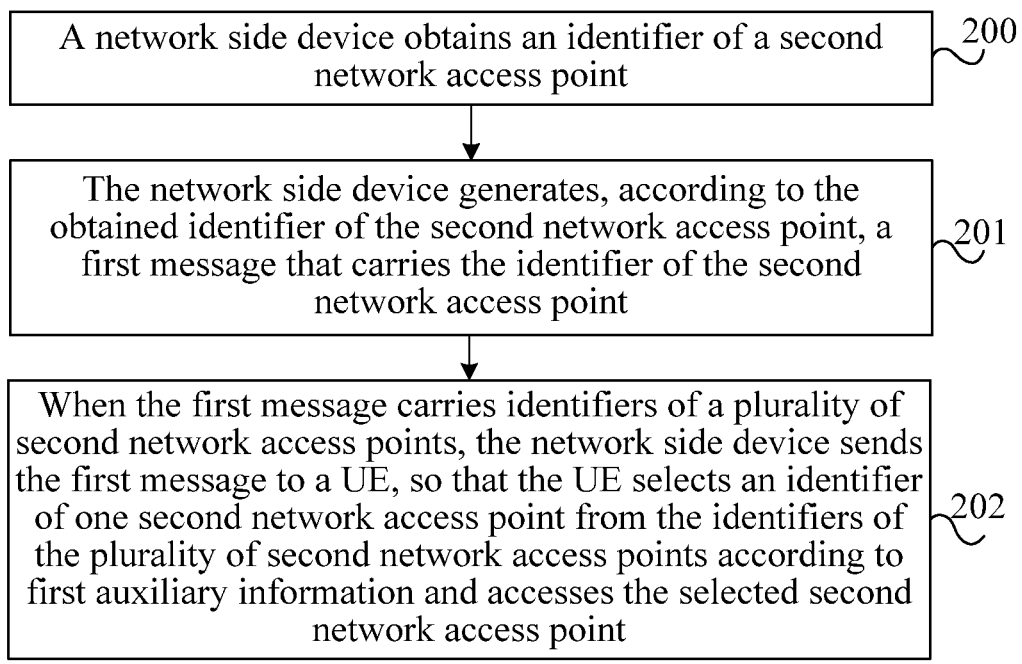
FIG. 2 is a flow chart of an access method provided in another embodiment of the present invention.

FIG. 2 is a flow chart of an access method provided in another embodiment of the present invention. As shown in FIG. 2, the access method in this embodiment may specifically include the following steps.

200: A network side device obtains an identifier of a second network access point.

In this embodiment, a second network access point corresponding to the identifier of the second network access point can perform air interface offloading on a first network in which a UE is currently located.

201: The network side device generates, according to the obtained identifier of the second network access point, a first message that carries the identifier of the second network access point.

202: When the first message carries identifiers of a plurality of second network access points, the network side device sends the first message to the UE, so that the UE selects an identifier of one second network access point from the identifiers of the plurality of second network access points according to first auxiliary information and accesses the selected second network access point.

It may be understood that a second network and the first network in this embodiment are communication networks of different standards and the second network may perform air interface offloading on the first network. Furthermore, in a situation where various second networks have common coverage, the second networks may be a plurality of networks of different standards. Optionally, the identifier of the second network access point in this embodiment can uniquely identify the second network access point.

Optionally, in this embodiment, the network side device may obtain an identifier of one second network access point, and may also obtain identifiers of a plurality of second network access points. Correspondingly, when the network side device generates, according to the obtained identifier of the second network access point, a first message that carries the identifier of the second network access point, the network side device may generate a first message that carries an identifier of one second network access point, or may generate a first message that carries identifiers of a plurality of second network access points. When the first message carries identifiers of a plurality of second network access points, the first message sent by the network side device to the UE carries the identifiers of the plurality of second network access points. In this way, the UE may select an identifier of one second network access point from the identifiers of the plurality of second network access points in the first message according to the first auxiliary information and access the selected second network access point.

A difference between this embodiment and the embodiment shown in FIG. 1 lies only in that in this embodiment, the technical solution in the embodiment of the present invention is described from a network device side, while in the embodiment shown in FIG. 1, the technical solution in the embodiment of the present invention is described from a UE side. For specific implementation processes of the embodiment shown in FIG. 1 and that shown in FIG. 2, reference may be made to each other.

With the access method according to this embodiment, a network side device obtains an identifier of a second network access point, and the network side device generates, according to the obtained identifier of the second network access point, a first message that carries the second identifier of the network access point. When the first message carries identifiers of a plurality of second network access points, the network side device sends the first message to a UE, so that the UE selects an identifier of one second network access point from the identifiers of the plurality of second network access points according to first auxiliary information, and accesses the selected second network access point. With the technical solution in this embodiment, the UE can select, according to first auxiliary information, an identifier of one second network access point from identifiers of a plurality of second network access points to access, and the UE does not need to attempt to access second network access points one by one, so that an access delay can be effectively shortened, and access efficiency can be improved, thereby effectively implementing offloading.

Optionally, the technical solution in the embodiment corresponding to FIG. 2 may be applied to a situation where the first network in which the UE is currently located simultaneously covers a plurality of second networks, for example, in a scenario of a macro site of the first network, the UE selects an identifier of a second network access point to be accessed.

Optionally, based on the technical solution in the foregoing embodiment, when the first message includes identifiers of a plurality of second network access points, step 201 "The network side device generates, according to the obtained identifier of the second network access point, a first message that carries the identifier of the second network access point" specifically includes that: the network side device screens obtained second network access points according to position information of each second network access point and/or load information of each second network access point, and generates a first message that carries the identifiers of the plurality of second network access points. For example, the solution may be applied to a situation where the first network in which the UE is currently located simultaneously covers a plurality of second networks, for example, in a scenario of a macro site of the first network, the UE and the network side device together select an identifier of a second network access point, where the identifier of the second network access point corresponds to a second network access point to be accessed by the UE. For example, a network side screens the plurality of second network access points according to the position information of each second network access point and/or the load information of each second network access point, and obtains identifiers of the plurality of second network access point, and then the UE further selects one second network access point from the plurality of second network access points according to position information of the UE and/or signal quality information of each second network access point, and accesses the selected second network access point.

Optionally, based on the technical solution in the foregoing embodiment, when the first message includes identifiers of a plurality of second network access points, step 201 "The network side device generates, according to the obtained identifier of the second network access point, a first message that carries the identifier of the second network access point" may specifically include that: the network side device directly generates a first message that carries obtained identifiers of all second network access points. A typical application scenario of the solution is a situation where the first network in which the UE is currently located simultaneously covers a plurality of second networks. For example, in a scenario of a macro site of the first network, the UE device selects an identifier of a second network access point of the second network access point to be accessed.

Optionally, based on the technical solution in the foregoing embodiment, when the first message includes only an identifier of one second network access point, the access method in the foregoing embodiment further includes:

sending, by the network side device, to the UE a first message that carries the identifier of the one second network access point, so that the UE accesses a second network access point corresponding to the identifier of the one second network access point.

Further, optionally, the access method in the foregoing embodiment further includes: receiving, by the network side device, a second message that is sent by the UE and carries position information of the UE and/or signal quality information of each second network access point.

Further, optionally, when the first message includes only an identifier of one second network access point, the network side device generates a first message that carries an identifier of one second network access point, which specifically includes that: the network side device screens a plurality of second network access points according to the position information of the UE and/or the signal quality information of each second network access point and position information of each second network access point and/or load information of each second network access point, and generates a first message that carries only the identifier of the one second network access point. A typical application scenario of the solution is a situation where the first network in which the UE is currently located simultaneously covers a plurality of second networks. For example, in a scenario of a macro site of the first network, the network side device selects an identifier of a second network access point of the second network access point to be accessed.

Optionally, the first network in the foregoing embodiment is a 3GPP mobile communication network, and the second network is a non-3GPP mobile communication network; or
the first network is a non-3GPP mobile communication network, and the second network is a short distance wireless communication network; or
the first network is a 3GPP mobile communication network, and the second network is a short distance wireless communication network.

The 3GPP mobile communication network includes a GSM, WCDMA, TD-SCDMA, or LTE network. The non-3GPP mobile communication network includes WIMAX or CDMA2000. The short distance wireless communication network includes a WLAN, infrared, Bluetooth, or Zigbee. In the embodiment of the present invention, it is preferred that the second network is a short distance wireless communication network.

Optionally, in the foregoing embodiment, when the second network is a WLAN, the identifier of the second network access point includes a basic service set identifier BSSID of the second network access point and/or a media access control (MAC) layer address of the second network access point. Definitely, based on the foregoing combination, an ESSID may further be included. For example, the identifier of the second network access point may be the BSSID of the second network access point+an ESSID of the second network access point.

It should be noted that based on the technical solution in the foregoing embodiment, the foregoing access method further includes: receiving, by the network side device, registration information sent by a second network access point, where the registration information includes an identifier of the second network access point; and then establishing, by the network side device, a mapping relationship between the identifier of the second network access point and the first network. That is to say, on the network device side, a plurality of second network access points used for performing offloading on the first network need to register with the network device side in advance. In this way, the network device side may allocate, for the first network, a corresponding second network access point used for offloading, and establish a binding relationship or a mapping relationship between the second network access point and the first network. For example, the network device side establishes a mapping between an identifier of a second network access point and the first network. In actual application, in a situation where the first network in which the UE is currently located simultaneously covers a plurality of second networks, for example, in a scenario of a micro site of the first network, one first network may correspond to only an identifier of one second network access point. In a scenario of a macro site, one first network may correspond to identifiers of a plurality of second network access points. In actual application, the registration information of the second network access point may further include at least one of: position information of the second network access point, an ESSID of the second network access point, and an IP address of the second network access point.

By adopting the technical solution in the foregoing embodiment, one second network access point can be selected from a plurality of second network access points for a UE to access, and the UE does not need to attempt to access second network access points one by one, so that an access delay can be effectively shortened, and access efficiency can be improved, thereby effectively implementing offloading.

Figure 3:
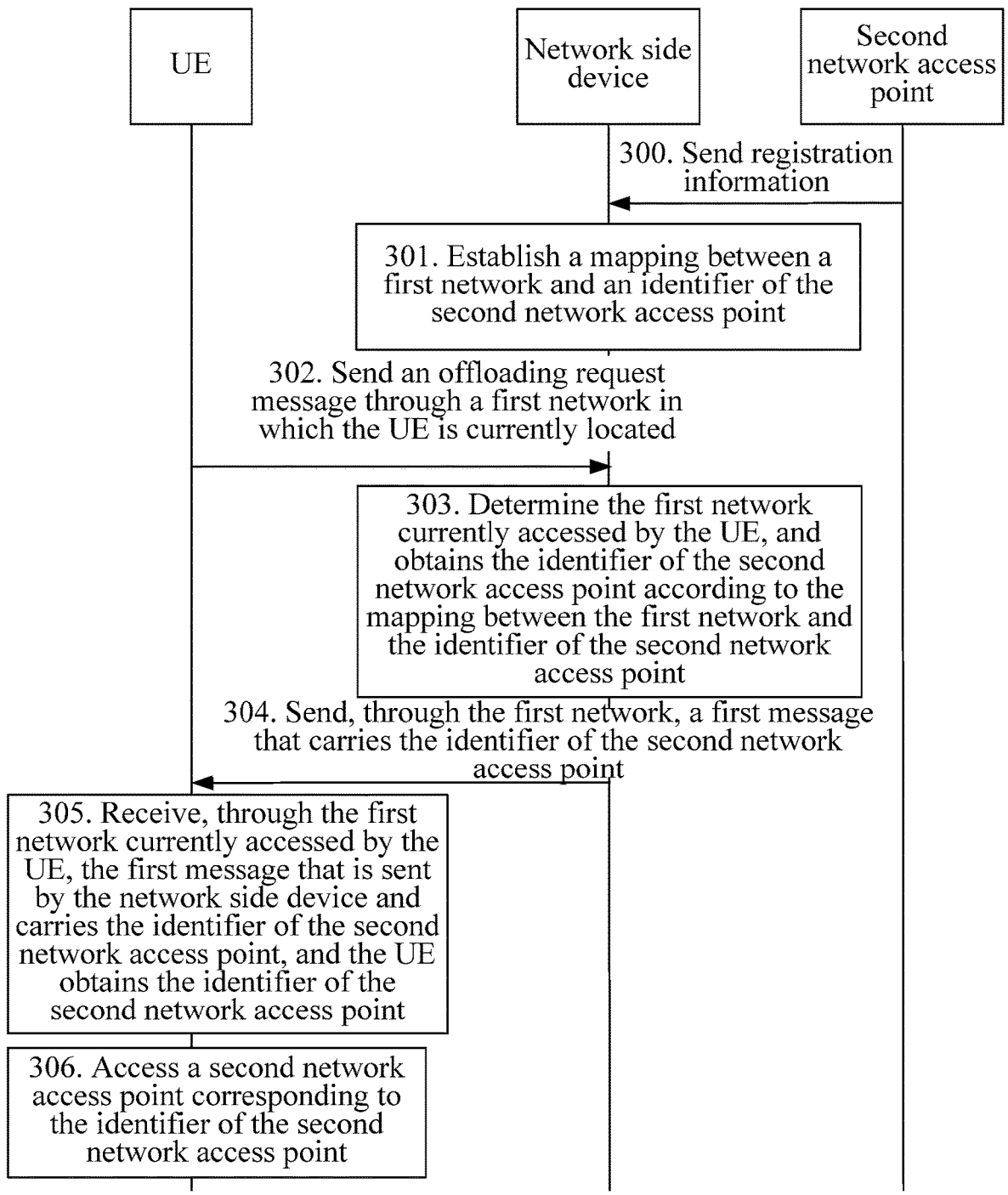
FIG. 3 is a signaling diagram of an access method provided in an embodiment of the present invention.

FIG. 3 is a signaling diagram of an access method provided in an embodiment of the present invention. In the access method in this embodiment, a scenario of a micro site of a first network in a situation where the first network in which a UE is currently located simultaneously covers a plurality of second networks is taken as an example to introduce the technical solution of the present invention in detail. As shown in FIG. 3, the access method in this embodiment may include the following steps.

300: A second network access point sends registration information to a network side device, so as to register on the network side device.

The registration information includes an identifier of the second network access point, and may further include position information of each second network access point and/or load information of each second network access point.

301: The network side device establishes a mapping between the first network and the identifier of the second network access point.

In this embodiment, in a scenario of a micro site, the first network corresponds to only one second network access point, and the identifier of the second network access point in this embodiment can uniquely identify the second network access point.

302: The UE sends an offloading request message to the network side device through the first network in which the UE is currently located.

303: The network side device determines the first network currently accessed by the UE, and obtains the identifier of the second network access point according to the mapping relationship between the first network and the identifier of the second network access point.

304: The network side device sends a first message to the UE through the first network, where the first message carries the identifier of the second network access point.

For example, in this embodiment, the first message may be an offloading establishment message.

305: The UE receives, through the first network currently accessed by the UE, the first message that is sent by the network side device and carries the identifier of the second network access point, and the UE obtains the identifier of the second network access point.

306: The UE accesses a second network access point corresponding to the identifier of the second network access point.

Preferably, the first network in this embodiment is a 3GPP mobile communication network or a non-3GPP mobile communication network, and the second network is a short distance wireless communication network. The 3GPP mobile communication network, the non-3GPP mobile communication network, the short distance wireless communication network, and the identifier of the second network access point are the same as those described in the foregoing embodiment, and for details, reference may be made to the description of the foregoing embodiment, which is not described herein again.

With the access method according to this embodiment, by adopting the technical solution in the foregoing embodiment, a UE can obtain a second network access point that can be accessed by the UE, and the UE does not need to attempt to access second network access points one by one, so that an access delay can be effectively shortened, and access efficiency can be improved, thereby effectively implementing offloading.

Figure 4:
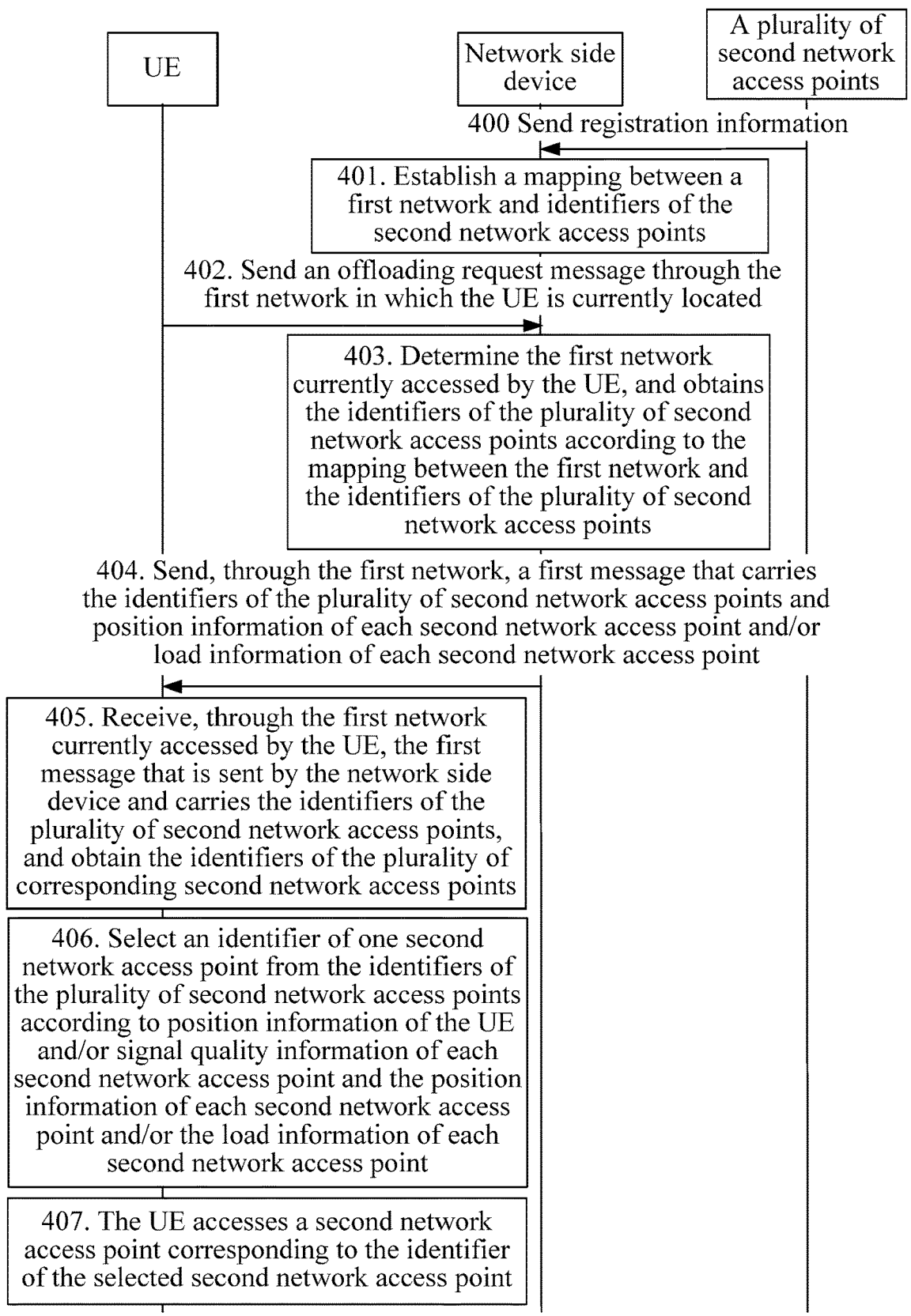
FIG. 4 is a signaling diagram of an access method provided in another embodiment of the present invention.

FIG. 4 is a signaling diagram of an access method provided in another embodiment of the present invention. In the access method in this embodiment, it is taken as an example that a UE selects an identifier of a second network access point to be accessed in a scenario of a macro site of a first network in a situation where the first network in which the UE is currently located simultaneously covers a plurality of second networks, so as to introduce the technical solution of the present invention in detail. As shown in FIG. 4, the access method in this embodiment may specifically include the following steps.

400: A plurality of second network access points send registration information to a network side device, so as to register with the network side device.

Registration information sent by each second network access point includes an identifier of the second network access point and position information of each second network access point and/or load information of each second network access point.

401: The network side device establishes a mapping between the first network and identifiers of the plurality of second network access points.

In this embodiment, in a scenario of a macro site, the first network corresponds to a plurality of second network access points, and an identifier of each second network access point in this embodiment can uniquely identify the second network access point.

402: The UE sends an offloading request message to the network side device through the first network in which the UE is currently located.

403: The network side device determines the first network currently accessed by the UE, and obtains the identifiers of the plurality of second network access points according to the mapping between the first network and the identifiers of the plurality of second network access points.

404: The network side device sends a first message to the UE through the first network, where the first message carries the identifiers of the plurality of second network access points, the position information of each second network access point and/or the load information of each second network access point.

For example, in this embodiment, the first message may be an offloading establishment message.

405: The UE receives, through the first network currently accessed by the UE, the first message that is sent by the network side device and carries the identifiers of the plurality of second network access points, and the UE obtains the identifiers of the plurality of corresponding second network access points.

406: The UE selects an identifier of one second network access point from the identifiers of the plurality of second network access points according to position information of the UE and/or signal quality information of each second network access point and the position information of each second network access point and/or the load information of each second network access point.

407: The UE accesses a second network access point corresponding to the identifier of the selected second network access point.

For example, the UE may obtain an identifier of one second network access point that is closest to the UE from the identifiers of the plurality of second network access points according to the position information of the UE and position information of the plurality of second network access points. Or, the UE may also obtain an identifier of a second network access point that is closest to the UE and has a smallest load from the identifiers of the plurality of second network access points through the position information of the UE, position information of the plurality of second network access points, and load information of the plurality of second network access points. Or, the UE may also obtain identifiers of a plurality of second network access points with the best signal quality information from the identifiers of the plurality of second network access points according to signal quality information of the plurality of second network access points, where the signal quality information is obtained through detection performed by the UE. Or, the UE may also comprehensively consider the position information of the UE, signal quality information of each second network access point, the position information of each second network access point, and the load information of each second network access point, where the signal quality information is obtained through detection performed by the UE, so as to obtain an identifier of a second network access point, where the identifier of the second network access point corresponds to a second network access point that is good in various aspects. In actual application, other manners of selecting an identifier of one second network access point from the identifiers of the plurality of second network access points deduced from the foregoing manners may be adopted, and examples are not listed one by one herein. In this embodiment, the UE can obtain the signal quality information of each second network access point through detection.

Preferably, the first network in this embodiment is a 3GPP mobile communication network or a non-3GPP mobile communication network, and the second network is a short distance wireless communication network. The 3GPP mobile communication network, the non-3GPP mobile communication network, the short distance wireless communication network, and the identifier of the second network access point are the same as those described in the foregoing embodiment, and for details, reference may be made to the description of the foregoing embodiment, which is not described herein again.

With the access method according to this embodiment, by adopting the technical solution in the foregoing embodiment, a UE can select an identifier of one second network access point from identifiers of a plurality of second network access points according to position information of the UE and/or signal quality information of each second network access point, and position information of each second network access point and/or load information of each second network access point, and accesses the selected second network access point. The UE does not need to attempt to access second network access points one by one, so that defects in the prior art that an access delay is too long and access efficiency is relatively low in a process that a UE accesses a correct WLAN AP can be solved, the access delay can be effectively shortened, and the access efficiency can be improved, thereby effectively implementing offloading.

Figure 5:
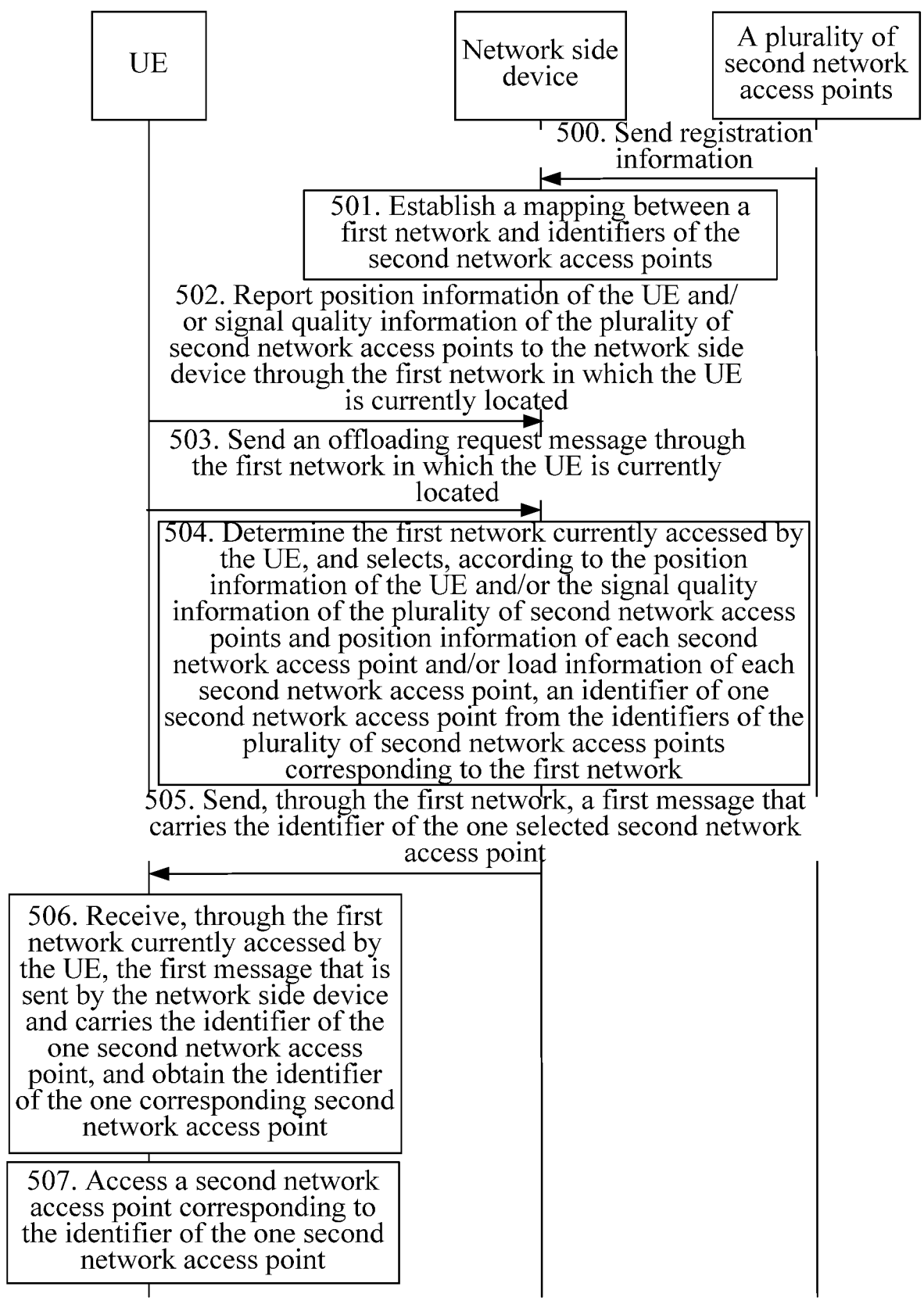
FIG. 5 is a signaling diagram of an access method provided in yet another embodiment of the present invention.

FIG. 5 is a signaling diagram of an access method provided in yet another embodiment of the present invention. In the access method in this embodiment, it is taken as an example that a network side device selects an identifier of a second network access point to be accessed in a scenario of a macro site of a first network in a situation where the first network in which a UE is currently located simultaneously covers a plurality of second networks, so as to introduce the technical solution of the present invention in detail. As shown in FIG. 5, the access method in this embodiment may include the following steps.

500: A plurality of second network access points send registration information to the network side device, so as to register with the network side device.

Registration information sent by each second network access point includes an identifier of the second network access point and position information of each second network access point and/or load information of each second network access point.

501: The network side device establishes a mapping between the first network and identifiers of the plurality of second network access points.

In this embodiment, in a scenario of a macro site, the first network corresponds to a plurality of second network access points, and an identifier of each second network access point in this embodiment can uniquely identify the second network access point.

502: The UE reports position information of the UE and/or signal quality information of the plurality of second network access points to the network side device through the first network in which the UE is currently located.

503: The UE sends an offloading request message to the network side device through the first network in which the UE is currently located.

There may be no sequence between step 502 and step 503.

504: The network side device determines the first network currently accessed by the UE, and selects, according to the position information of the UE and/or the signal quality information of the plurality of second network access points and the position information of each second network access point and/or the load information of each second network access point, an identifier of one second network access point from the identifiers of the plurality of second network access points corresponding to the first network.

For example, the network side device may obtain an identifier of one second network access point that is closest to the UE from the identifiers of the plurality of second network access points according to the position information of the UE and position information of the plurality of second network access points. Or, the network side device may also obtain an identifier of a second network access point that is closest to the UE and has a smallest load from the identifiers of the plurality of second network access points through the position information of the UE, position information of the plurality of second network access points, and load information of the plurality of second network access points. Or, the network side device may also obtain identifiers of a plurality of second network access points with the best signal quality information from the identifiers of the plurality of second network access points according to signal quality information of the plurality of second network access points, where the signal quality information is obtained through detection performed by the UE. Or, the position information of the UE, signal quality information of each second network access point, the position information of each second network access point, and the load information of each second network access point may be comprehensively considered, where the signal quality information is obtained through detection performed by the UE, so as to obtain an identifier of a second network access point, where the identifier of the second network access point corresponds to a second network access point that is good in various aspects. In actual application, other manners of selecting an identifier of one second network access point from the identifiers of the plurality of second network access points deduced from the foregoing manners may be adopted, and examples are not listed one by one herein.

505: The network side device sends a first message to the UE through the first network, where the first message carries the identifier of the one selected second network access point.

For example, in this embodiment, the first message may be an offloading establishment message.

506: The UE receives, through the first network currently accessed by the UE, the first message that is sent by the network side device and carries the identifier of the one second network access point, and the UE obtains the identifier of the one corresponding second network access point.

507: The UE accesses a second network access point corresponding to the identifier of the one second network access point.

In this embodiment, the UE can obtain the signal quality information of each second network access point through detection.

Optionally, the first network in this embodiment is a 3GPP mobile communication network or a non-3GPP mobile communication network, and the second network is a short distance wireless communication network. The 3GPP mobile communication network, the non-3GPP mobile communication network, the short distance wireless communication network, and the identifier of the second network access point are the same as those described in the foregoing embodiment, and for details, reference may be made to the description of the foregoing embodiment, which is not described herein again.

With the access method according to this embodiment, by adopting the technical solution in the foregoing embodiment, a network side device can obtain, according to position information of a UE and/or signal quality information of a plurality of second network access points and position information of each second network access point and/or load information of each second network access point, an identifier of one second network access point from identifiers of the plurality of second network access points corresponding to a first network, and notifies the UE, so that the UE accesses a second network access point corresponding to the identifier of the second network access point. The UE does not need to attempt to access second network access points one by one, so that an access delay can be effectively shortened, and access efficiency can be improved, thereby effectively implementing offloading.

Figure 6:
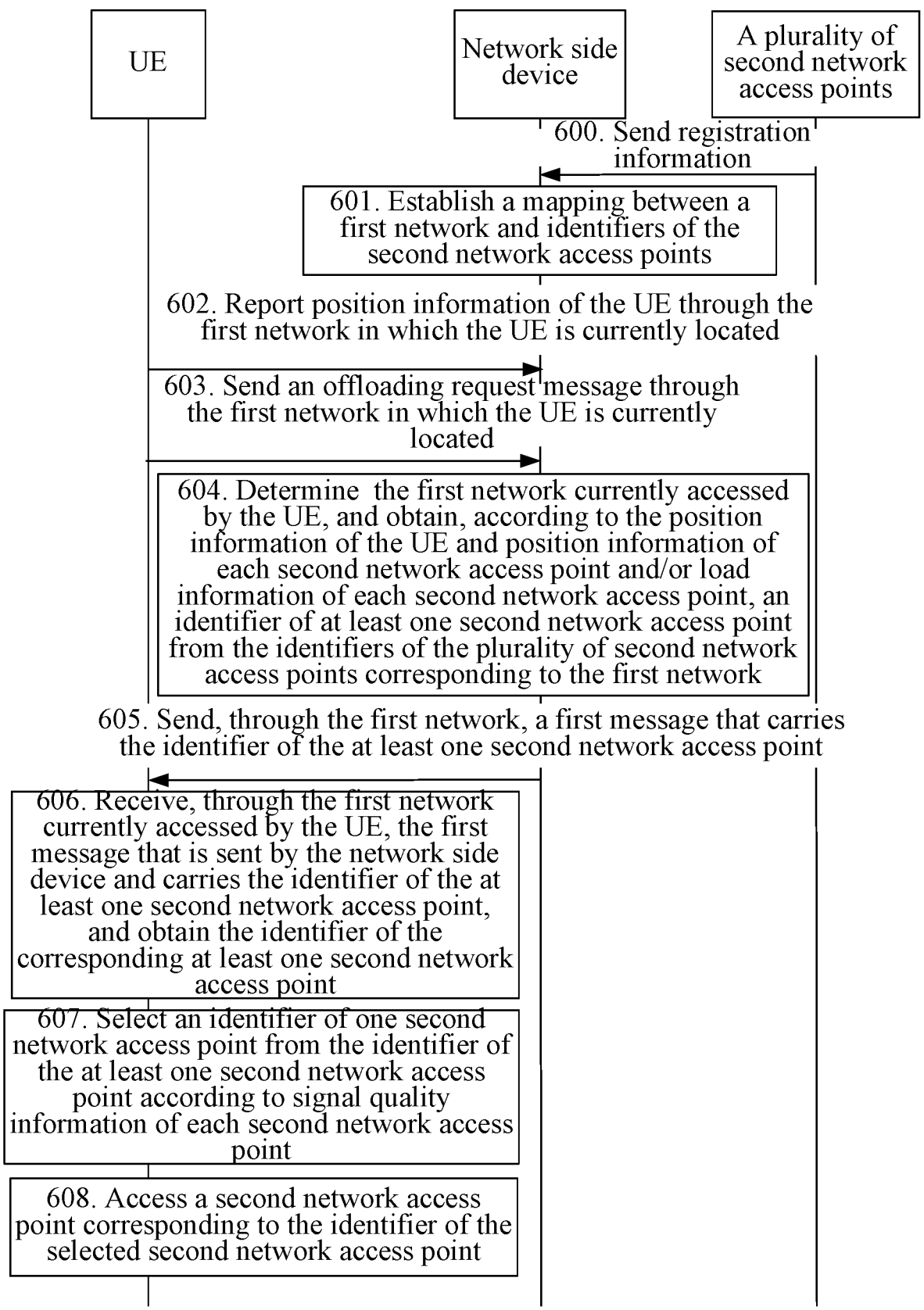
FIG. 6 is a signaling diagram of an access method provided in still another embodiment of the present invention.

FIG. 6 is a signaling diagram of an access method provided in still another embodiment of the present invention. In the access method in this embodiment, it is taken as an example that a UE and a network side device together select an identifier of a second network access point to be accessed in a scenario of a macro site of a first network in a situation where the first network in which the UE is currently located simultaneously covers a plurality of second networks, so as to introduce the technical solution of the present invention in detail. As shown in FIG. 6, the access method in this embodiment may specifically include the following steps.

600: A plurality of second network access points send registration information to the network side device, so as to register with the network side device.

Registration information sent by each second network access point includes at least an identifier of the second network access point and position information of each second network access point and/or load information of each second network access point.

601: The network side device establishes a mapping between the first network and identifiers of the plurality of second network access points.

In this embodiment, in a scenario of a macro site, the first network corresponds to a plurality of second network access points, and an identifier of each second network access point in this embodiment can uniquely identify the second network access point.

602: The UE reports position information of the UE to the network side device through the first network in which the UE is currently located.

603: The UE sends an offloading request message to the network side device through the first network in which the UE is currently located.

There may be no sequence between step 602 and step 603.

604: The network side device determines the first network currently accessed by the UE, and obtains, according to the position information of the UE and the position information of each second network access point and/or the load information of each second network access point, an identifier of at least one second network access point from the identifiers of the plurality of second network access points corresponding to the first network.

For example, the network side device may obtain an identifier of at least one second network access point that is closest to the UE from the identifiers of the plurality of second network access points according to the position information of the UE and position information of the plurality of second network access points. Or, the network side device may also obtain an identifier of at least one second network access point that is closest to the UE and has a smallest load from the identifiers of the plurality of second network access points through the position information of the UE, position information of the plurality of second network access points, and load information of the plurality of second network access points. Or, the network side device may also obtain an identifier of at least one second network access point that has a smallest load from the identifiers of the plurality of second network access points according to load information of the plurality of second network access points. In actual application, other manners of selecting an identifier of one second network access point from the identifiers of the plurality of second network access points deduced from the foregoing manners may be adopted, and examples are not listed one by one herein.

605: The network side device sends a first message to the UE through the first network, where the first message carries the identifier of the at least one second network access point.

For example, in this embodiment, the first message may be an offloading establishment message.

606: The UE receives, through the first network currently accessed by the UE, the first message that is sent by the network side device and carries the identifier of the at least one second network access point, and the UE obtains the identifier of the corresponding at least one second network access point.

607: The UE selects an identifier of one second network access point from the identifier of the at least one second network access point according to signal quality information of each second network access point.

For example, the UE obtains an identifier of a second network access point from the identifier of the at least one second network access point according to the signal quality information of each second network access point, where the identifier of the second network access point corresponds to a second network access point with the best signal quality.

608: The UE accesses a second network access point corresponding to the identifier of the selected second network access point.

In this embodiment, the UE can obtain the signal quality information of each second network access point through detection.

Preferably, the first network in this embodiment is a 3GPP mobile communication network or a non-3GPP mobile communication network, and the second network is a short distance wireless communication network. The 3GPP mobile communication network, the non-3GPP mobile communication network, the short distance wireless communication network, and the identifier of the second network access point are the same as those described in the foregoing embodiment, and for details, reference may be made to the description of the foregoing embodiment, which is not described herein again.

With the access method according to this embodiment, by adopting the technical solution in the foregoing embodiment, a network side device and a UE together select an identifier of a second network access point that can be accessed by the UE, so that the UE accesses a second network access point corresponding to the identifier of the second network access point. The UE does not need to attempt to access second network access points one by one, so that an access delay can be effectively shortened, and access efficiency can be improved, thereby effectively implementing offloading.

Persons of ordinary skill in the art may understand that, all or part of the steps of the foregoing method embodiments may be implemented by a program instructing relevant hardware. The foregoing program may be stored in a computer readable storage medium. When the program is run, the steps included in the foregoing method embodiments are performed. The foregoing storage medium may be any medium capable of storing program codes, such as a ROM, a RAM, a magnetic disk, or an optical disk.

Figure 7:
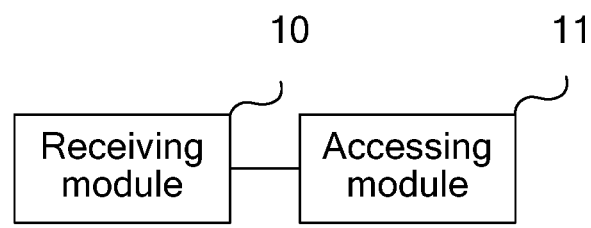
FIG. 7 is a schematic structural diagram of a UE provided in an embodiment of the present invention.

FIG. 7 is a schematic structural diagram of a UE provided in an embodiment of the present invention. As shown in FIG. 7, the UE in this embodiment may include: a receiving module 10 and an accessing module 11.

In this embodiment, the receiving module 10 is configured to receive a first message that carries an identifier of a second network access point, where the second network access point can perform air interface offloading on a first network in which the UE is currently located. The accessing module 11 is connected to the receiving module 10, and the accessing module 11 is configured to, when the first message carries identifiers of a plurality of second network access points, select, according to first auxiliary information, one second network access point from the plurality of second network access points received by the receiving module 10; and access the selected second network access point.

With the UE in this embodiment, an implementation mechanism for implementing access by adopting the foregoing modules is the same as an implementation mechanism in the foregoing relevant method embodiment, and for details, reference may be made to the description of the foregoing relevant method embodiment, which is not described herein again.

With the UE according to this embodiment, by adopting the foregoing modules, one second network access point can be selected from a plurality of second network access points according to first auxiliary information, and the UE does not need to attempt to access second network access points one by one, so that an access delay can be effectively shortened, and access efficiency can be improved, thereby effectively implementing offloading.

Optionally, based on the embodiment shown in FIG. 7, the following extended technical solution may further be included to form an extended embodiment of the embodiment shown in FIG. 7.

In the extended embodiment of the embodiment shown in FIG. 7, the identifiers of the plurality of second network access points carried in the first message are obtained through screening performed by a network side device according to second auxiliary information of each second network access point. The second auxiliary information includes position information of each second network access point and/or load information of each second network access point. At this time, correspondingly, the accessing module 11 is configured to select one second network access point from the plurality of second network access points according to position information of the UE and/or signal quality information of each second network access point, and access the selected second network access point.

Optionally, in the extended embodiment of the embodiment shown in FIG. 7, the accessing module 11 is configured to, when the first message further carries position information of each second network access point and/or load information of each access point, select one second network access point from the plurality of second network access points according to the position information of each second network access point and/or the load information of each second network access point in the first message that is received by the receiving module 10 and position information of the user equipment and/or signal quality information of each second network access point, and access the selected second network access point.

Optionally, in the extended embodiment of the embodiment shown in FIG. 7, the accessing module 11 is configured to, when the first message includes only an identifier of one second network access point, access a second network access point corresponding to the identifier of the one second network access point.

At this time, further, optionally, the UE may further include a sending module. The sending module is configured to, when the identifier of the one second network access point is obtained through screening performed by the network side device on the plurality of second network access points, send position information of the UE and/or signal quality information of each second network access point to the network side device, so that the network side device selects one second network access point from the plurality of second network access points according to the position information of the UE and/or the signal quality information of each second network access point.

Optionally, the sending module in the foregoing embodiment is further configured to send an air interface offloading request message of a network access point to the network side device through the first network.

Optionally, the first message in the foregoing embodiment is a message after the air interface offloading request message and before the UE accesses the second network access point.

Optionally, the first network in the foregoing embodiment is a 3GPP mobile communication network, and a second network is a non-3GPP mobile communication network; or the first network is a non-3GPP mobile communication network, and a second network is a short distance wireless communication network; or the first network is a 3GPP mobile communication network, and a second network is a short distance wireless communication network.

Optionally, the 3GPP mobile communication network in the foregoing embodiment includes a GSM, WCDMA, TD-SCDMA, or LTE network. The non-3GPP mobile communication network includes WIMAX or CDMA2000. The short distance wireless communication network includes a WLAN, infrared, Bluetooth, or Zigbee.

Optionally, in the foregoing embodiment, when the second network is a WLAN, the identifier of the second network access point includes one or a combination of the following: a BSSID of the second network access point and a media access control MAC layer address of the second network access point. Definitely, based on the foregoing combination, an ESSID may further be included. For example, the identifier of the second network access point may be the BSSID of the second network access point+an ESSID of the second network access point.

With the UE in the foregoing embodiment, an implementation mechanism for implementing access by adopting the foregoing modules is the same as an implementation mechanism in the foregoing relevant method embodiment, and for details, reference may be made to the description of the foregoing relevant method embodiment, which is not described herein again.

With the UE according to the foregoing embodiment, by adopting the foregoing modules, an optimal second network access point can be selected through auxiliary information for the UE to access, and the UE does not need to attempt to access second network access points one by one. Therefore, an access delay can be effectively shortened, and access efficiency can be improved, thereby effectively implementing offloading.

Figure 8:
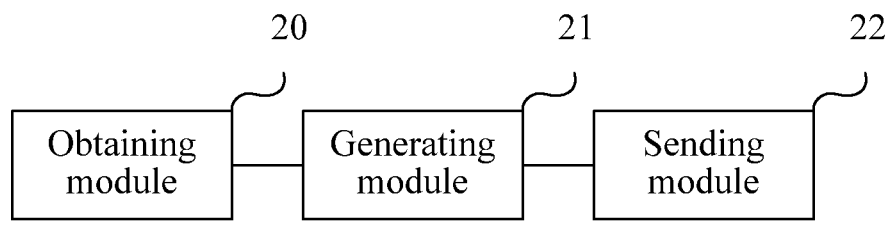
FIG. 8 is a schematic structural diagram of a network side device provided in an embodiment of the present invention.

FIG. 8 is a schematic structural diagram of a network side device provided in an embodiment of the present invention. As shown in FIG. 8, the network side device in this embodiment may specifically include: an obtaining module 20, a generating module 21, and a sending module 22.

The obtaining module 20 is configured to obtain an identifier of a second network access point, where a second network access point corresponding to the identifier of the second network access point can perform air interface offloading on a first network in which a UE is currently located. The generating module 21 is connected to the obtaining module 20, and the generating module 21 is configured to generate, according to the obtained identifier of the second network access point, a first message that carries the identifier of the second network access point obtained by the obtaining module 20. The sending module 22 is connected to the generating module 21, and the sending module 22 is configured to, when the first message generated by the generating module 21 carries identifiers of a plurality of second network access points, send, to the UE, the first message generated by the generating module 21, so that the UE selects an identifier of one second network access point from the identifiers of the plurality of second network access points according to first auxiliary information and accesses the selected network access point.

With the network side device in this embodiment, an implementation mechanism for implementing access by adopting the foregoing modules is the same as an implementation mechanism in the foregoing relevant method embodiment, and for details, reference may be made to the description of the foregoing relevant method embodiment, which is not described herein again.

With the network side device according to this embodiment, an identifier of a second network access point can be obtained by adopting the foregoing modules, and according to the obtained identifier of the second network access point, a first message that carries the identifier of the second network access point is generated. When the first message carries identifiers of a plurality of second network access points, the first message is sent to a UE, so that the UE selects an identifier of one second network access point from the identifiers of the plurality of second network access points according to first auxiliary information and accesses the selected second network access point. With the technical solution in this embodiment, the UE can select, according to first auxiliary information, an identifier of one second network access point from identifiers of a plurality of second network access points to access, and the UE does not need to attempt to access second network access points one by one, so that an access delay can be effectively shortened, and access efficiency can be improved, thereby effectively implementing offloading.

Optionally, based on the embodiment shown in FIG. 8, the following extended technical solution may further be included to form an extended embodiment of the embodiment shown in FIG. 8.

In the extended embodiment of the embodiment shown in FIG. 8, when the first message carries identifiers of a plurality of second network access points, specifically, the obtaining module 20 may obtain the identifiers of the plurality of second network access points, and the generating module 21 is specifically configured to, when the first message carries the identifiers of the plurality of second network access points, screen obtained second network access points according to position information of each second network access point and/or load information of each second network access point, and generate a first message that carries the identifiers of the plurality of second network access points obtained by the obtaining module 20.

Optionally, based on the embodiment shown in FIG. 8, the generating module 21 is specifically configured to, when the first message carries identifiers of a plurality of second network access points, directly generate a first message that carries identifiers of all second network access points obtained by the obtaining module 20.

Optionally, based on the embodiment shown in FIG. 8, the sending module 22 is further configured to, when the first message includes only an identifier of one second network access point, send, to the UE, a first message that carries the identifier of the one second network access point, so that the UE accesses a second network access point corresponding to the identifier of the one second network access point.

Optionally, based on the embodiment shown in FIG. 8, the network side device further includes a receiving module. The receiving module is configured to receive a second message that is sent by the UE and carries position information of the UE and/or signal quality information of each second network access point. At this time, correspondingly, the generating module 21 is configured to, when the first message includes only an identifier of one second network access point, screen, according to the position information of the UE and/or the signal quality information of each second network access point received by the receiving module and position information of each second network access point and/or load information of each second network access point, a plurality of second network access points obtained by the obtaining module 20; and generate a first message that carries only the identifier of the second network access point.

Optionally, based on the foregoing embodiment, the first network is a 3GPP mobile communication network, and a second network is a non-3GPP mobile communication network; or the first network is a non-3GPP mobile communication network, and a second network is a short distance wireless communication network; or the first network is a 3GPP mobile communication network, and a second network is a short distance wireless communication network.

Optionally, based on the foregoing embodiment, the 3GPP mobile communication network includes a GSM, WCDMA, TD-SCDMA, or LTE network. The non-3GPP mobile communication network includes WIMAX or CDMA2000. The short distance wireless communication network includes a WLAN, infrared, Bluetooth, or Zigbee.

Optionally, based on the foregoing embodiment, when the second network is a WLAN, the identifier of the second network access point includes a basic service set identifier BSSID of the second network access point and/or a media access control MAC layer address of the second network access point. Definitely, based on the foregoing combination, an ESSID may further be included. For example, the identifier of the second network access point may be the BSSID of the second network access point+an ESSID of the second network access point.

Optionally, based on the foregoing embodiment, the network side device in this embodiment further includes an establishing module. The receiving module is further configured to receive registration information sent by a second network access point, where the registration information includes an identifier of the second network access point. The establishing module is connected to the receiving module, and the establishing module is configured to establish a mapping between the identifier of the second network access point received by the receiving module and the first network. At this time, correspondingly, the obtaining module is connected to the establishing module, and the obtaining module 20 is configured to obtain the identifier of the second network access point from the mapping between the identifier of the second network access point and the first network, where the mapping is established by the establishing module.

With the network side device in the foregoing embodiment, an implementation mechanism for implementing access by adopting the foregoing modules is the same as an implementation mechanism in the foregoing relevant method embodiment, and for details, reference may be made to the description of the foregoing relevant method embodiment, which is not described herein again.

With the network side device according to the foregoing embodiment, by adopting the foregoing modules, one second network access point can be selected from a plurality of second network access points for a UE to access, and the UE does not need to attempt to access second network access points one by one, so that an access delay can be effectively shortened, and access efficiency can be improved, thereby effectively implementing offloading.

Figure 9:
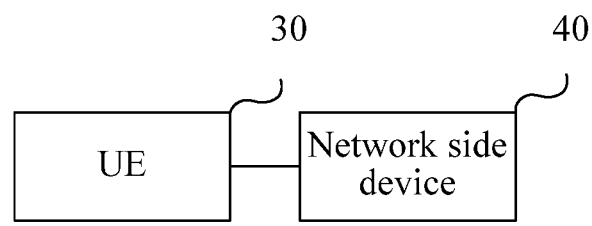
FIG. 9 is a schematic structural diagram of an access system provided in an embodiment of the present invention.

FIG. 9 is a schematic structural diagram of an access system provided in an embodiment of the present invention. As shown in FIG. 9, the access system in this embodiment includes a UE 30 and a network side device 40.

The UE 30 may specifically adopt the embodiment shown in FIG. 7, and the network side device 40 may adopt a network side device in the embodiment shown in FIG. 8. Or the UE 30 may specifically adopt a UE in the extended embodiment of the embodiment shown in FIG. 7, and the network side device 40 may adopt a network side device in the extended embodiment of the embodiment shown in FIG. 8. Access is implemented by adopting an implementation mechanism of a relevant method in the foregoing relevant method embodiment, and for details, reference may be made to the description of the foregoing relevant embodiment, which is not described herein again.

With the access system according to this embodiment, by adopting the foregoing UE and network side device, one second network access point can be selected from a plurality of second network access points for the UE to access, and the UE does not need to attempt to access second network access points one by one, so that an access delay can be effectively shortened, and access efficiency can be improved, thereby effectively implementing offloading.

The network side device in the foregoing embodiment of the present invention may specifically be a RAN device, a device on a core network side, or a device on a packet data network side. For example, the RAN device may be an RAN device in a 2G radio access network, a 3G radio access network, a 4G radio access network, and a future radio access network. In the foregoing embodiment of the present invention, the second network access point may be an AP device in WLAN technologies, such as 802.11a, 802.11c, 802.11g, 802.11ac, and 802.11ag.

The foregoing described apparatus embodiments are merely exemplary. The units described as separate parts may or may not be physically separated, and parts displayed as units may or may not be physical units, may be located in one position, or may be distributed on at least two network elements. A part of or all of the modules may be selected according to an actual need to achieve the objectives of the solutions of the embodiments. Persons of ordinary skill in the art may understand and implement the embodiments without creative efforts.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to a part of technical features of the technical solutions, as long as these modifications or replacements do not make the essence of corresponding technical solutions depart from the scope of the technical solutions in the embodiments of the present invention.

What is claimed is:

1. An access method comprising:
   receiving, by a mobile device, from a network side device, identifiers of a plurality of network access points in a second network,
      wherein each of the network access points is capable of performing air interface offloading with a first network in which the mobile device is currently located, and
      wherein the identifiers of the plurality of network access points are derived by the network side device based on at least load and position information in association with each network access point;
   selecting, by the mobile device, one of the plurality of network access points; and
   receiving, by the mobile device, data from the selected network access point and the first network.

2. The method according to claim 1, wherein selecting one of the plurality of network access points is based on one of:
   position information in association with the mobile device,
   signal quality information in association with each network access point, or position information in association with the mobile device and signal quality information in association with each network access point.

3. The method according to claim 1, further comprising:
   receiving, by the mobile device, at least the load information of each network access point, wherein selecting one of the plurality of network access points is based on at least the position information of each network access point.

4. The method according to claim 1, wherein the first network is a $3^{rd}$ Generation Partnership Project (3GPP) mobile communication network, and a second network is a non-3GPP mobile communication network; or
   the first network is a non-3GPP mobile communication network, and the second network is a short distance wireless communication network; or
   the first network is a 3GPP mobile communication network, and the second network is a short distance wireless communication network;
      wherein the 3GPP mobile communication network comprises a global mobile communication (GSM), wideband code division multiple access (WCDMA), time division-synchronous code division multiple access (TD-SCDMA), or long term evolution (LTE) network, the non-3GPP mobile communication network comprises worldwide interoperability for microwave access (WIMAX) or code division multiple access (CDMA) 2000, and the short distance wireless communication network comprises a wireless local area network (WLAN), infrared, Bluetooth, or Zigbee.

5. The method according to claim 4, wherein when the second network is a WLAN, the identifiers of the plurality of network access points comprise any one or a combination of the following: a basic service set identifier (BSSID) of the second network access point and a media access control (MAC) layer address of the second network access point.

6. The method according to claim 1, further comprising:
receiving, by the mobile device, at least the load information of each network access point, wherein selecting one of the plurality of network access points is based on at least the load information of each network access point.

7. The method according to claim 1, further comprising:
receiving, by the mobile device, at least the load information of each network access point, wherein selecting one of the plurality of network access points is based on at least the position information of the mobile device.

8. The method according to claim 1, further comprising:
receiving, by the mobile device, at least the load information of each network access point, wherein selecting one of the plurality of network access points is based on at least signal quality information of each network access point.

9. A mobile device comprising a processor and a non-transitory computer-readable storage medium including computer-executable instructions that, when executed, cause the processor to perform operations comprising:
receiving, from a network side device, identifiers of a plurality of network access points in a second network, wherein each of the network access points is capable of performing air interface offloading with a first network in which the mobile device is currently located, and
wherein the identifiers of a plurality of network access points are derived by the network side device based on at least load and position information in association with each network access point;
selecting, by the mobile device, one of the plurality of network access points; and
receiving data from the selected network access point and the first network.

10. The mobile device according to claim 9, wherein selecting one of the plurality of network access points is based on one of:
position information in association with the mobile device,
signal quality information in association with each network access point or,
position information in association with the mobile device and signal quality information in association with each network access point.

11. The mobile device according to claim 9, wherein the operations further include:
receiving, by the mobile device, the position information of each network access point and/or the load information of each network access point,
wherein selecting one of the plurality of network access points is based on at least one of:
the position information of each network access point,
the load information of each network access point,
position information of the mobile device, or
signal quality information of each network access point.

12. A system of chipset for a mobile device configured to execute computer-executable instructions stored in a memory of the mobile device and enable the mobile device to perform operations comprising:
receiving, from a network side device, identifiers of a plurality of network access points in a second network, wherein each of the network access points is capable of performing air interface offloading with a first network in which the mobile device is currently located, and
wherein the identifiers of a plurality of network access points are derived by the network side device based on at least load and position information in association with each network access point;
selecting, by the mobile device, one of the second network access point from the plurality of second network access points; and
receiving, by the mobile device, data from the selected network access point and the first network.

13. The system of chipset according to claim 12, wherein selecting one of the plurality of network access points is based on one of:
position information in association with the mobile device,
signal quality information in association with each network access point or,
position information in association with the mobile device and signal quality information in association with each network access point.

14. A non-transitory computer-readable storage medium including computer-executable instructions for a mobile device that, when the computer-executable instructions are executed by a processor of the mobile device, enables the mobile device to perform operations comprising:
receiving, from a network side device, identifiers of a plurality of network access points in a second network, wherein each of the network access points is capable of performing air interface offloading with a first network in which the mobile device is currently located, and
wherein the identifiers of a plurality of network access points are derived by a network side device based on at least load and position information in association with each network access point;
selecting, by the mobile device, one of the plurality of network access points; and
receiving, by the mobile device, data from the selected network access point and the first network.

15. The non-transitory computer-readable storage medium according to claim 14, wherein selecting one of the plurality of network access points is based on one of:
position information in association with the mobile device,
signal quality information in association with each network access point or,
position information in association with the mobile device and signal quality information in association with each network access point.

16. The non-transitory computer-readable storage medium according to claim 14, wherein when the computer-executable instructions are executed by the processor of the mobile device, enabling the mobile device to further perform operations comprising:
receiving the position information of each network access point and/or the load information of each network access point, wherein selecting one of the plurality of network access points is based on at least the position information of each network access point.

17. The non-transitory computer-readable storage medium according to claim 14, wherein when the computer-executable instructions are executed by the processor of the mobile device, enabling the mobile device to further perform operations comprising:
receiving the position information of each network access point and/or the load information of each network access point, wherein selecting one of the plurality of network access points is based on at least the load information of each network access point.

18. The non-transitory computer-readable storage medium according to claim 14, wherein when the computer-executable instructions are executed by the processor of the mobile device, enabling the mobile device to further perform operations comprising:

receiving the position information of each network access point and/or the load information of each network access point, wherein selecting one of the plurality of network access points is based on at least position information of the mobile device.

19. The non-transitory computer-readable storage medium according to claim 14, wherein when the computer-executable instructions are executed by the processor of the mobile device, enabling the mobile device to further perform operations comprising:

receiving the position information of each network access point and/or the load information of each network access point, wherein selecting one of the plurality of network access points is based on at least signal quality information of each network access point.

* * * * *